Sept. 1, 1959 E. M. GUYER 2,902,573
ELECTRIC GLASS WORKING
Filed April 24, 1957 6 Sheets-Sheet 1
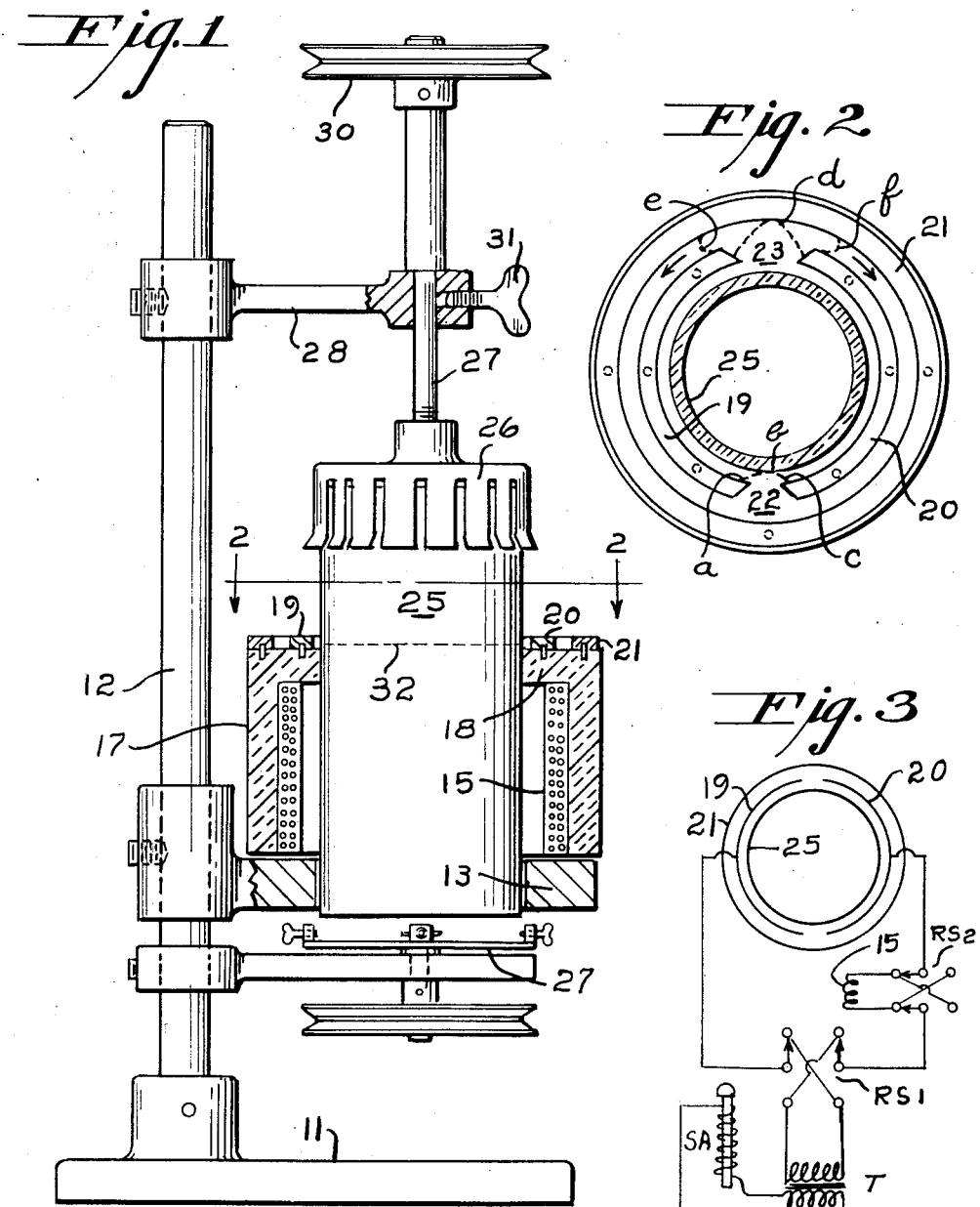
INVENTOR.
EDWIN M. GUYER
BY Clarence R. Oatly
ATTORNEY Sept. 1, 1959 E. M. GUYER 2,902,573
ELECTRIC GLASS WORKING
Filed April 24, 1957 6 Sheets-Sheet 2
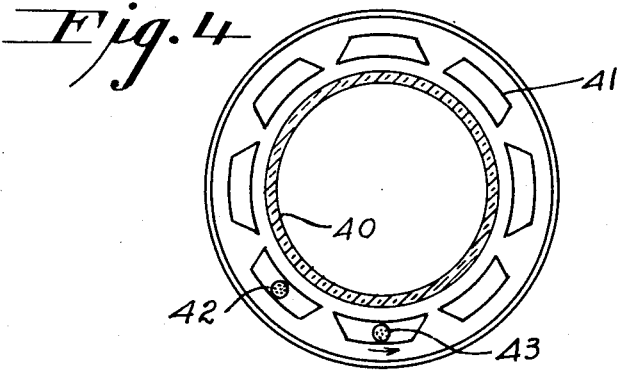
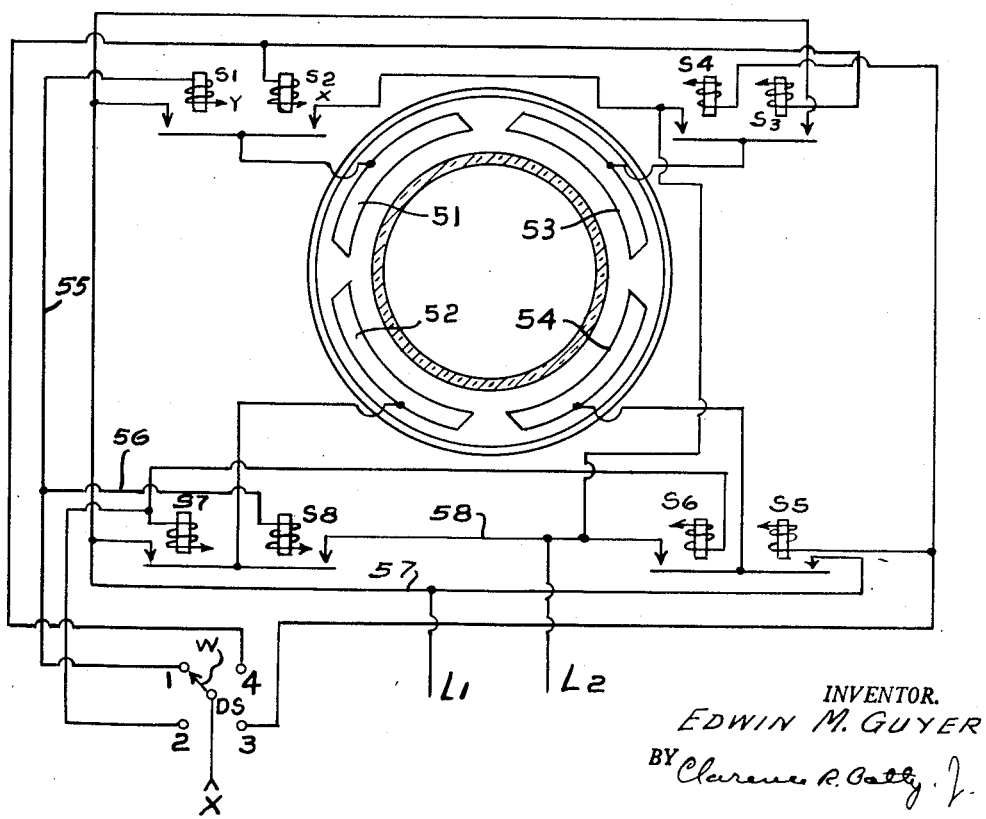
INVENTOR.
EDWIN M. GUYER
BY Clarence R. Catty
ATTORNEY Sept. 1, 1959    E. M. GUYER    2,902,573
ELECTRIC GLASS WORKING
Filed April 24, 1957    6 Sheets-Sheet 3
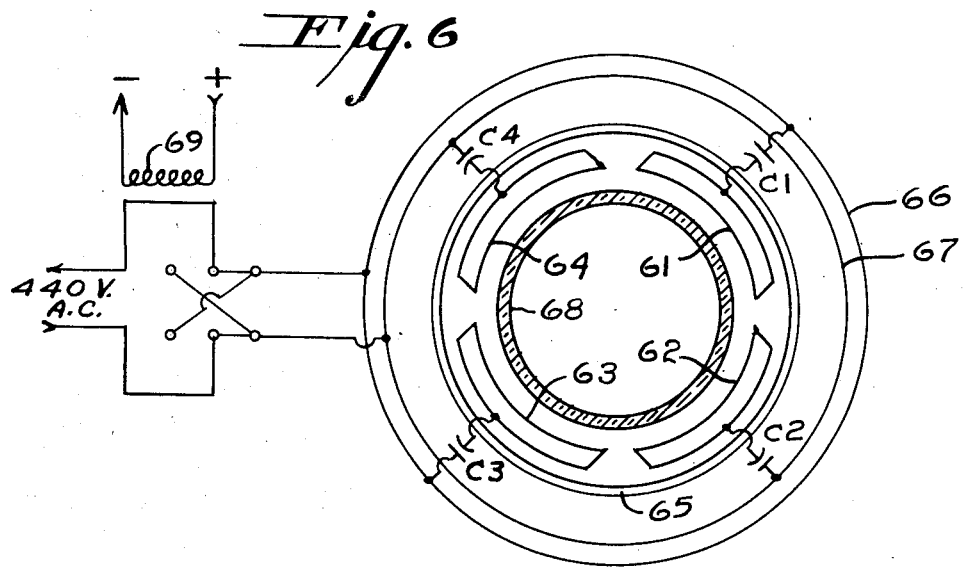
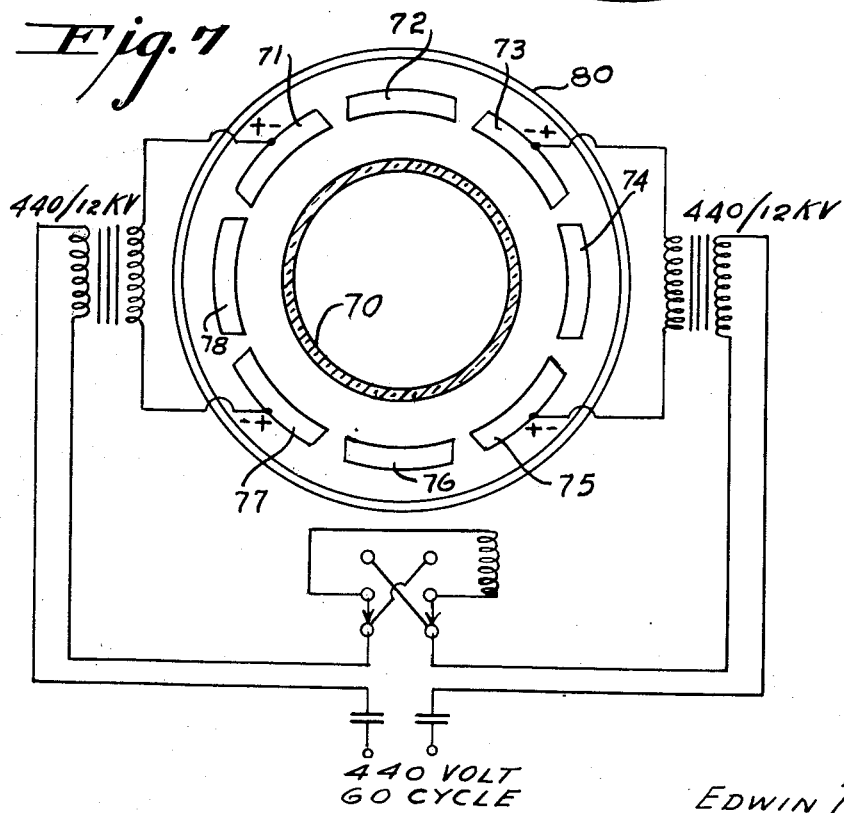
INVENTOR.
EDWIN M. GUYER
BY Clarence R. Oatly, Jr.
ATTORNEY Sept. 1, 1959          E. M. GUYER          2,902,573

ELECTRIC GLASS WORKING

Filed April 24, 1957          6 Sheets-Sheet 4

INVENTOR.
EDWIN M. GUYER
BY Clarence R. Patty, Jr.
ATTORNEY

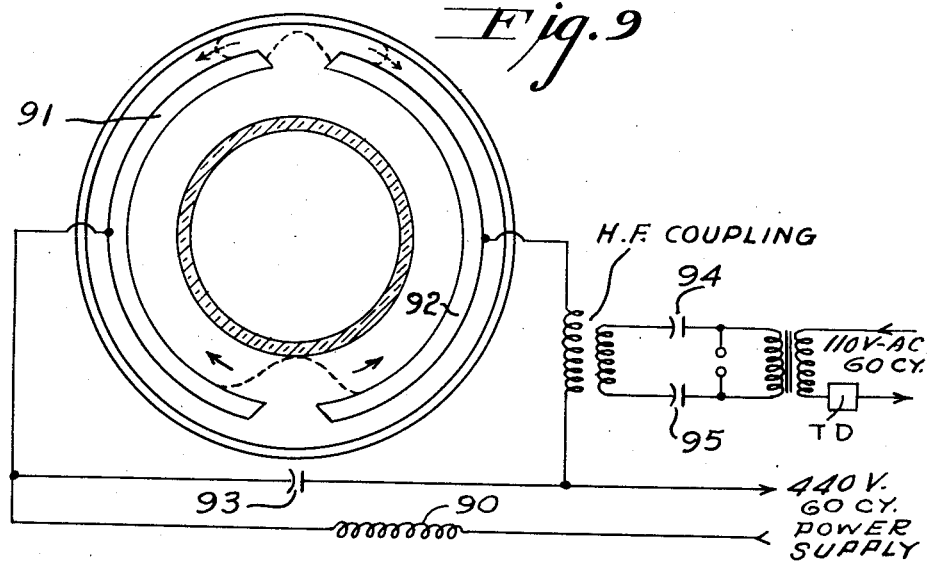
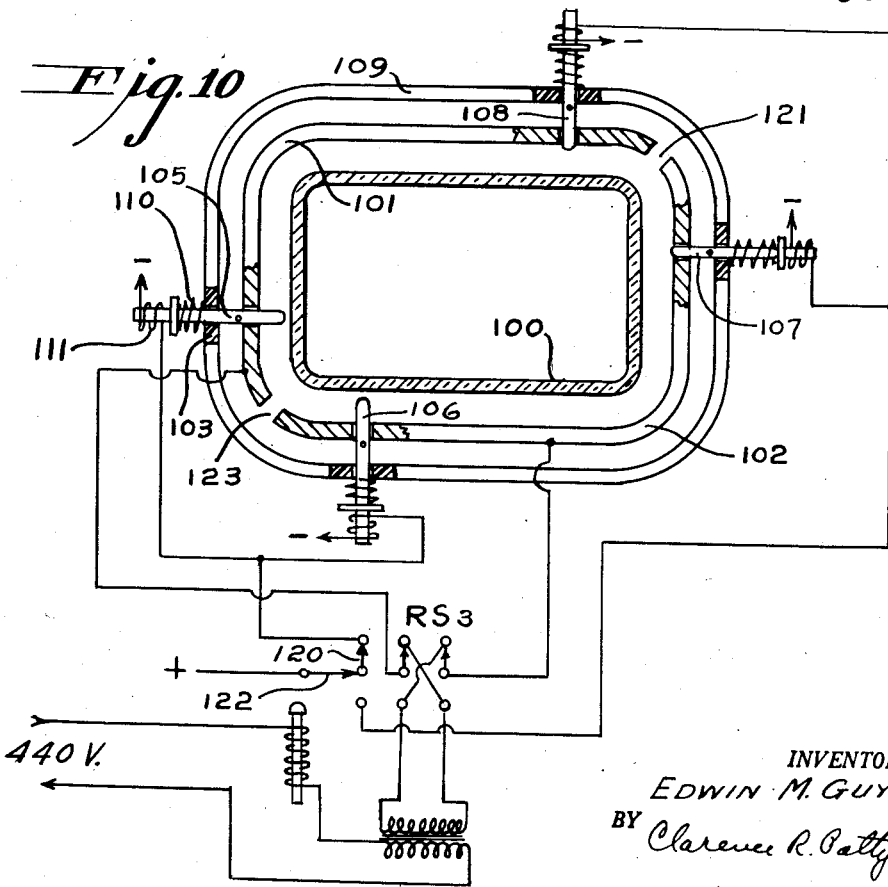

Sept. 1, 1959 E. M. GUYER 2,902,573
ELECTRIC GLASS WORKING
Filed April 24, 1957 6 Sheets—Sheet 6

Tuned Transformer Circuit

Resonant T-Circuit

Monocyclic Square Circuit

INVENTOR.
EDWIN M. GUYER
BY Clarence R. Patty, Jr.
ATTORNEY

United States Patent Office 2,902,573
Patented Sept. 1, 1959

2,902,573

ELECTRIC GLASS WORKING

Edwin M. Guyer, Corning, N.Y., assignor to Corning Glass Works, Corning, N.Y., a corporation of New York Application April 24, 1957, Serial No. 654,740

20 Claims. (Cl. 219—19)

The present invention relates to a new system of arc heating suitable for electric glassworking which is free of the limitations of those systems heretofore known.

Electric glass working involves the transformation of electric energy into heat adjacent to or inside a glass or other dielectric workpiece. This heat may be generated by an electric arc alone, or by an electric arc supplemented by the conduction of electric current through the portions of the workpiece which it is desired to heat. Since glass at room temperature is an insulator it has usually been customary, in accordance with past practice, to preheat the workpiece to a temperature at which it becomes an electrical conductor. This requires gas flames or other auxiliary preheating facilities, such as for example conductive coatings, which complicate and increase the cost of electric glass working machines. Furthermore, the rate at which these electric conduction currents can be built up in the glass with the past electrode arrangements for electric heating is strictly limited by the so called "energy acceptance" of the glass, as otherwise flashover occurs directly between the electrodes. Moreover, ordinary welding acrs as used for metal working are not suitable for working glass, because they burn up the electrodes, stain and boil the glass, and their intense heat can not be restricted to desired patterns in the glass.

According to the invention the forgoing disadvantages of electric glass working are wholly overcome by use of two or more special arc runner electrodes of appropriate configurations arranged in spaced end to end relation about or along the region of the workpiece to be electrically heated, and are oriented in a magnetic field whose lines of force have a component which passes at right angles, or normal to the plane of the electrodes. Power is applied to the electrodes at a voltage high enough to cause an arc discharge to initially pass through one or more relatively short gaps between the ends of adjacent electrodes. The magnetic field bends each such electric arc into a curve and forces part of the arc plasma stream against the workpiece surface directly opposite such gap. The bent arc by this action acquires a shape such that the current travels in three different directions, namely, from the one electrode toward the workpiece surface, along such surface and from such surface toward the companion of the electrodes between which the arc was initiated. Since, however, the magnetic field lines run normal to the plane of the runner electrodes the arc current moves at right angles to such lines and to its own instantaneous direction, one part of such arc advancing along each electrode while a third part of it remains anchored to the workpiece surface against which it is magnetically forced. By such action the arc stretches and presses against or wraps itself tightly around the workpiece which is thereby heated by the arc current in the zone of interception of the arc column. When the arc has extended itself to the opposite ends of the electrodes it bows outward at the gap between the far ends of the electrodes and is intercepted by an arc return conductor that parallels the arc runner electrodes. Upon contacting the arc return conductor the arc splits up into two different parts which carry current and travel in opposite directions until the two arc parts again unite at the starting gap between such electrode runner ends. As the two parts of the split arc are reunited the current is once more in such a direction that the magnetic field bends it into a curve with the central portion forced against the surface of the workpiece and the heating cycle is repeated. The above heating and arc return cycles are continued until the workpiece has been heated as required to perform a desired glass working operation.

The workpiece may be heated in the above fashion with or without the benefit of heat by electric conduction. The preferred variation of the method is entirely dependent on the size, shape characteristics, or composition of the workpiece. Preferably, if the workpiece has a coating thereon in the region adjacent that to be worked which might be damaged by conduction heating, such form of heating is avoided by maintaining the applied potential below that at which the heated glass will accept an appreciable amount of current. Such method is also most appropriate when the composition of the workpiece is such that it is a poor conductor even at high temperatures, such for example as fused silica.

In the non-conduction form of heating, heating rates can be accelerated when arc trapping ledges can be formed, as at the junction of a seal when thick and thin section workpieces are to be joined to one another. Similarly, arc trapping grooves can be formed between two workpieces of substantially the same wall thickness if the meeting edge of at least one of such workpieces is beveled back from its inner edge to provide an arc trapping groove along the line of juncture of the workpieces. Regulation of the heat input during arc flame heating can be effected by variation of the magnetic field strength.

When unusually high precision heat control is required, irrespective of whether flame or conduction heating is taking place, it can be achieved by accurately timed application of heating current interspersed with short periods of cooling. The rate of heating under these circumstances is determined by the current through the arc multiplied by the voltage across it and its time-on to time-off ratio.

When conduction heating is employed a high enough potential is used to pass a substantial amount of current through the workpiece as soon as it has attained a conductive temperature. Therefore, in the late stages of glass workpiece heating by electric conduction, the discharge arc is no longer stretched around the workpiece, but instead travels along the hot stripe in the glass just as it would travel along an arc-runner electrode. During this final stage of the process, the short arcs between the electrodes and the return conductor serve almost entirely as electrically conducting brushes conveying heating current into and out of the hot conducting glass. The magnetic field however in which heating is taking place at all times keeps the arcs in rapid motion over the arc-runner electrodes and thus insures that the heat concentration of the arc is never such as to destroy either the surfaces of the electrodes or of the workpiece. The electrodes also provide complete protection against heat loss by surface flashover in the event that the power supply exceeds the "energy acceptance" of the glass at any stage of the process.

When the length of the heating path is short, as in the treatment of miniature workpieces, two runner electrodes may suffice. When the paths are longer four or more electrodes are preferably employed. Under the latter circumstances the heat input may be effected by applying power to adjacent pairs of electrodes in sucession or alternatively when higher speed heating is desired, power may be concurrently applied to different groups of the electrodes to concurrently heat the respective sections of the workpiece along such path.

Moreover, if the workpiece is so positioned that the arcs travel along a horizontal path hollow electrodes may be employed, having open slots faced toward the workpiece and with such electrodes connected to a vacuum line, to counteract the tendency for hot gases generated by the arc to rise by convection and thus aid the magnetic field in confining the arc heat to a very narrow region.

Irrespective of the conduction heating method employed, the operation may, if desired, be further accelerated to some extent by application of a stripe of conductive material along the heating path. With such a stripe present, electric conduction heating can be established substantially immediately.

Also, irrespective of the heating method employed, uniform heating of a circular path about a circular workpiece may be assured by its rotation or its oscillation about its axis as heating proceeds. It is, of course, also possible to effect even heating by rotation or oscillation of the electrodes about the workpiece, or to cause them to travel thereabout, but such practices usually introduce mechanical complexities that are preferably avoided. If the path to be heated is noncircular, or if for one reason or another rotation of the workpiece is to be avoided, uniform heating can be assured by periodically reversing the direction of arc travel so that the starting gaps are repeatedly interchanged. Such reversals may be effected either by reversing the direction of the magnetic field, or by reversing the arc current relative to the magnet current in any suitable or approved fashion, as by simple reversing switches under appropriate timer control.

Also, according to the invention, an arc travel and dwell type of operation is possible and may afford certain advantages under certain circumstances. Such an arrangement embodies a number of arc travel stopping gates in suitable positions along the arc runner electrodes that may be operated at will to stop the arc travel or be disabled to permit resumption of the arc travel. This type of operation can be obtained by association with the arc-runner electrodes of movable conductors or gates which can be extended into closer proximity of the workpiece than are the runner electrodes to stop the arc, or be retracted to allow arc travel to be resumed, or by the use of vacuum electrodes such as disclosed in Patent No. 2,590,173 in lieu of such movable conductors.

For a better understanding of the invention reference is made to the accompanying drawings in which:

Fig. 1 is a side elevation, partly in section of an apparatus suitable for practicing the invention and showing a tubular workpiece associated therewith.

Fig. 2 is a view taken on line 2—2 of Fig. 1.

Fig. 3 is a diagrammatic representation of the arrangement of Fig. 1 and of its operating circuit.

Fig. 4 diagrammatically illustrates an alternative form of the apparatus arranged about a workpiece which may be of large diameter.

Fig. 5 diagrammatically illustrates another form of the apparatus arranged about a workpiece and circuits for feeding power to its electrodes.

Fig. 6 diagrammatically illustrates the structural arrangement of Fig. 5, but with an alternative power feed system.

Fig. 7 diagrammatically illustrates a still further alternative arrangement and a power feed therefor.

Figure 8:
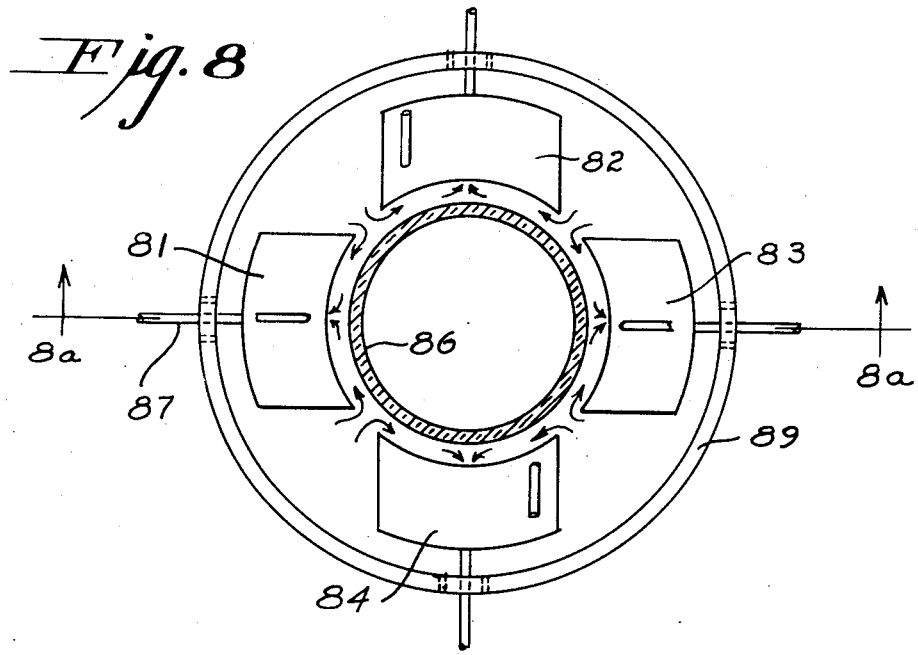

Fig. 8 diagrammatically illustrates a structure employing hollow electrodes.

Figure 8A:
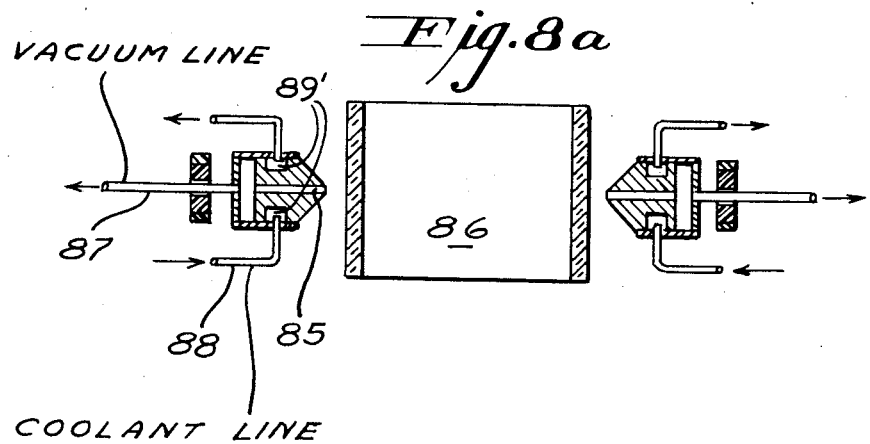

Fig. 8a is a sectional view taken on line 8a—8a of Fig. 8.

Fig. 9 diagrammatically illustrates the arrangement of electrodes as in Fig. 1, but with a power supply circuit especially suitable for low cost precision heat input control.

Fig. 10 diagrammatically illustrates an arrangement wherein the electrodes have associated therewith gates for effecting an arc travel and dwell type of operation.

Figure 11:
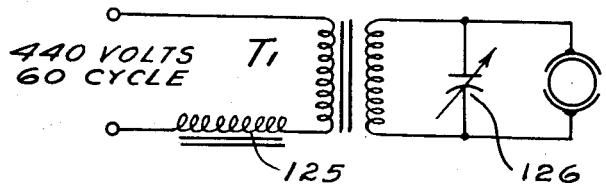
Figure 12:
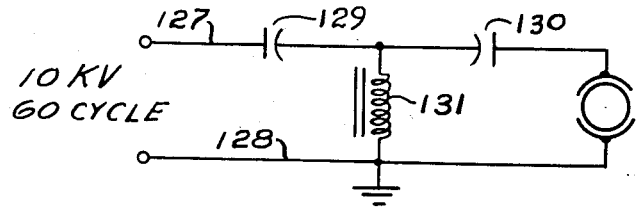
Figure 13:
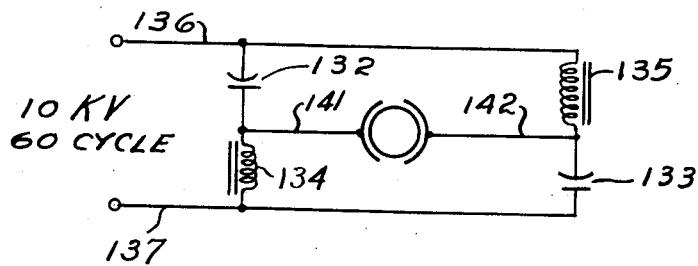

Figs. 11, 12 and 13 illustrate three different forms of power supply networks any which may be used with any of the electrode arrangements shown.

Referring to Figs. 1 and 2 in detail, there is shown a base 11 provided with a vertical column 12, from a lower region of which a platform 13 projects and on which is mounted a hollow core magnet 15. A tube 17 of highly refractory dielectric material surrounds the magnet 15 and has an inwardly extended flange 18 that serves as a support for arc runner electrodes 19 and 20 and for an arc return conductor 21. The flange 18 also serves to protect the magnet 15 from arc flames that issue between the runner electrodes 19 and 20 and a workpiece such as 25. Workpiece 25 is suspended within the bore of magnet 15 from a chuck 26 attached to the lower end of a vertical shaft 27 supported from a side arm 28 projected from column 12. The upper end of shaft 27 is provided with a pulley 30 by means of which the shaft may be rotated if desired, although rotation of the workpiece is not necessary. A winged screw 31 is provided to lock the shaft 27 against rotation if desired.

With an arrangement such as shown in Figs. 1, 2 and 3, electric power is applied to the electrodes 19 and 20 at a voltage high enough to cause an arc discharge across the gap 22, the shorter of the two gaps 22 and 23 therebetween. As shown current from a 440 v. alternating current supply is fed through a saturable reactor SA and the primary winding of a transformer T whose secondary winding transmits the sealing current through a reversing switch RS1 to electrode 19 and through a second reversing switch RS2 and the winding of magnet 15 in series, to the electrode 20. In the absence of a magnetic field the resulting arc would follow a straight line across gap 22. Such field, however, will bend the arc into a curve that forces part of the arc stream against the surface of the workpiece 25 directly opposite gap 22. The bent arc will have thus acquired, by this action, a shape such that the arc current will be traveling in three different directions in the three different parts of the discharge path, as shown in Fig. 2 by the interrupted line designated by the letters a, b and c. At a, the current is moving from arc runner electrode 19 toward the workpiece, at b, it is moving along the workpiece surface, and at c it is moving from the workpiece toward arc runner electrode 20. The field of magnet 15 however, has the same direction—out of the plane of the diagram—at all of these points. Therefore, since the arc current must move at right angles to the field and to its own instantaneous direction, part a moves to the left and part c moves to the right along the arc runner electrodes 19 and 20 respectively, while part b is anchored to the surface of the workpiece 25, against which it is forced by the field of magnet 15. Since both arc ends a and c continue to move rapidly in opposite directions over the arc runner electrodes 19 and 20 and the central arc column b remains blocked by the workpiece surface, the arc stretches and wraps itself tightly around the workpiece which is thereby heated in the zone of interception of the encircling arc column.

As the arc arrives at the electrode ends, it bows outward toward the return conductor 21 as indicated by interrupted line d across the gap 23, and as it contacts return conductor 21 it splits up into parts e and f which carry current in the opposite directions indicated, and continue such travel until they again join one another at gap 22, whereupon the described heating cycle is repeated.

The above described heating cycles, interspersed with arc return cycles, continue until an electrically conducting stripe is formed on the workpiece surface. Thereafter, by maintenance of a suitable current potential, electric conduction heating is established and continues until the workpiece 25 is suitably melted along the heat input line.

In the late stages of heating by electric conduction, the arc discharge is no longer stretched around the surface of the workpiece, but instead travels along the hot stripe in the workpiece just as it would travel over an arc-runner electrode. During this final period of the process, the short arcs, such as e and f, serve almost entirely as electrically conducting brushes conveying heating current into and out of the hot conducting glass. The magnetic field, however, still keeps the arcs in rapid motion over the arc runner electrodes 19 and 20 and insures against the arc destroying of either the surface of the runner electrodes or the workpiece. The electrodes also provide complete protection against heat loss by surface flashover in the event that the power supply exceeds the "energy acceptance" of the workpiece at any stage of the process, because the magnetic field continues to drive the arc column or plasma against the glass.

If the workpiece 25 is to be heated by the non-conduction method, as previously pointed out, the input potential is merely held below that at which any substantial amount of current will be caused to flow through the heated glass and the series ballast reactance is reduced to increase the arc current. The glass is then wholly heated by the current carried by the arc stretched thereabout, rather than by current flowing through it.

In the showing of Figs. 1 and 2, uniform heating may be assured by rotation of the workpiece or by periodically operating switch RS1 to periodically reverse the direction of current flow to the electrodes 19 and 20, or alternatively, by similarly operating switch RS2 to periodically reverse the polarity of magnet 15, to reverse the direction of arc travel.

In Fig. 1 the glassworking operation is illustrated as applied to the severance of the workpiece 25 along the interrupted line 32 and as is obvious the lower section of the workpiece will be dropped, upon severance, onto a support 27. As will be clearly evident, a workpiece arranged on support 27 can be elevated into engagement with a workpiece held in chuck 26, and by appropriate control of the applied potential the two workpieces can then be sealed together by either of the described glassworking methods.

Although methods of glass working, utilizing but two arc-runner electrodes, as above described, are capable of satisfactorily working glassware of small dimensions, large workpieces can be more satisfactorily worked by using a greater number of arc-runner electrodes arranged along or around the workpiece, for example as illustrated in Fig. 4. In this illustration eight arc-runner electrodes such as 41 are shown arranged about a workpiece 40. Suitably supported power supply brushes 42 and 43 are rotated about the electrodes to successively connect power to adjacent pairs thereof to successively heat segments of a path about the workpiece in the same fashion that the entire path about workpiece 25 is heated by power supplied to electrodes 19 and 20.

Alternatively, as illustrated in Fig. 5, the same results as with rotating brushes can be obtained by using distribution switches S1–S8. This is accomplished by so exciting each of the arc-runner electrodes 51–54 in sequence that each is paired alternately with the one ahead of it and the one behind it to progressively scan the workpiece with a traveling arc. In the showing of Fig. 5 the distribution switches S1–S8 are illustrated as being operated by their associated magnets in the desired pair combinations in succession by means of a suitable step-by-step distributor switch DS. As will be seen, in this arrangement when the wiper W engages contact 1, circuits are closed for the magnets of switches S1 and S8 which operate and thus connect the power supply line conductors L1 and L2 to arc runner electrodes 51 and 52 respectively. The operating circuits for the magnets of switches S1 and S8 extend from an X terminal of a suitable current source, through wiper W, conductor 55 and through the magnet of switch S1 to a Y terminal of the same current source, and via a branch conductor 56 through the magnet of switch S8 to a second Y terminal of such current source respectively. The circuit to electrode 51 extends from line L1, through conductor 57 and the contacts of switch S1. The circuit to electrode 52 extends from line L2 through conductor 58 and the contacts of switch S8. Similar circuits are established to connect the leads L1 and L2 to the adjoining pairs of arc runner electrodes 52 and 54, 54 and 53 and 53 and 51 respectively in succession as switch wiper W successively engages its contacts 2, 3 and 4.

In some instances, as when particularly large workpieces are to be worked, it may be desirable to simultaneously heat the different sections thereof along a path thereabout. By way of example, power can be separately supplied to the electrodes 51 and 52 and to 53 and 54 respectively which would effect the simultaneous heating of the respective halves of the workpiece along a path thereabout in the same manner in which the workpiece 25 is heated by a single pair of electrodes.

A further alternative way of simultaneously heating the respective halves of a workpiece along a path thereabout is shown in Fig. 6 wherein arc-runner electrodes 61 and 63 are connected via suitable distributor impedances, in the present instance shown as capacitors C1 and C3 to conductor 66 of a heating current source and the remaining alternately disposed electrodes 62 and 64 are connected via suitable distributor capacitors C2 and C4 to the other conductor 67 of such source. With such an arrangement arc travel occurs concurrently between the adjacent ends of the respective paired electrodes; and as in the description of the two-electrode arrangement, the arcs travel to their opposite ends while being wrapped about the adjacent section of the workpiece 68. As in the showing of Figs. 2, 4 and 5, there is an arc return conductor, designated 65, which is contacted by the respective arcs which split up and return thereover to their starting points as in the preceding arrangements.

As illustrated in Fig. 7, another way of heating a large workpiece 70 is to surround it with alternately arranged active and passive runner electrodes, such as 71 through 78, and by connecting separate power sources to the electrodes 71 and 77 and to the electrodes 73 and 75 respectively. In this arrangement two active electrodes arc to the passive electrodes and the two series connected arcs behave as in the preceding description since they circulate about their respective electrodes and return via the common arc return conductor 80.

The arrangement of Fig. 8 is equivalent to those in Figs. 5 and 6, but the electrodes 81 to 84 are hollow, as made clear in Fig. 8a, and each has a narrow slot such as 85 along its length open toward the workpiece 86. Such electrodes are surrounded by an arc return conductor 89. Vacuum lines such as 87 are in communication with the electrodes to establish the necessary suction along the electrode slots to neutralize any thermal updraft created by the arcs, when the electrodes are arranged in a horizontal plane, as in Fig. 1. As illustrated such electrodes are also provided with passages such as 89' through which an electrode cooling medium may be circulated, from a coolant line such as 88.

As illustrated in Fig. 9, again showing an electrode arrangement like that of Fig. 3, when high precision heat control is required the heating current may be economically supplied from a 440 v. 60 cycle power supply with the field control magnet 90 connected in series with the electrode 91 and serving also as a ballast reactor as in Fig. 3. The electrodes 91 and 92 are in this instance connected to the 440 v. A.C. source at too low a voltage to start or to maintain an arc discharge in the presence of the series connected field magnet 90. In order to make it possible to start, to maintain, and to stop a traveling arc there is provided a coupling with a high voltage H.F. pilot wave source including a by-pass capacitor 93 that serves to prevent blocking of H.F. pilot current by the magnet 90 and to prevent H.F. currents from penetrating the 440 v. A.C. 60 cycle power system. The pilot source can be either a small vacuum tube oscillator or quenched gap converter. Because of their low power level, either type can be constructed and operated at very low cost. A timing device T.D. in a conductor of the 60 cycle pilot power source may be operated to connect and disconnect power to the electrodes 91 and 92 periodically.

Referring now to Fig. 10, a travel and dwell arrangement is applied to the heating of a rectangular workpiece 100 surrounded with suitable arc runner electrodes 101 and 102, provided with magnetically operable gates 105 through 108. The power feed arrangement shown is identical to that shown in Fig. 3. Each gate passes through a bushing such as 103 in the arc return conductor 109 and is normally held in a retracted or open position by a spring such as 110, but is adapted to be closed by the energization of an associated magnet coil 111. The magnet coils of gates 105 and 106 are energized over an obvious circuit including a switch 122 and an auxiliary blade 120 of the reversing switch RS3 when the switch is in the position shown. The coils of gates 107 and 108 are similarly energizable through blade 120 when the switch RS3 is in its alternative position.

With the four shown gates 105–108 open the operation is obviously as described with respect to Fig. 3. With switch RS3 in the position shown and switch 122 closed the gates 105 and 106 are closed, as shown. With current being supplied to the electrodes 101 and 102 and with the switch RS3 in the position shown, an arc is established at the arc gap 121 and progressively wraps itself about the workpiece 100, but will be stopped upon arrival at the gates 105 and 106 until such time that the direction of current flow is reversed by operation of switch RS3. When the circuit connections are reversed the magnet coils of gates 107 and 108 are energized in lieu of those of gates 105 and 106. Under these circumstances the arc will be established in the gap 123 and will advance about the electrodes until intercepted by the gates 107 and 108. In a travel-dwell type of installation facilities for preventing overheating of the electrodes may be necessary or desirable. Electrodes of the type illustrated in Fig. 8 are one form suitable for such use. As previously mentioned gates 105–108 may if desired be replaced with vacuum electrodes of the type disclosed in Patent No. 2,590,173. The opening and closing of the gates of such an arrangement would of course then be effected by operation of valves in the vacuums lines connected to such electrodes.

The arc return conductor can be dispensed with in any of the illustrated examples if arrangements are made to discontinue the application of power each time the arc reaches the far ends of the electrodes and to then reconnect such power thereto. However, their presence is desirable since they prevent "flashover" should the applied power at any time exceed the "energy acceptance" of the workpiece.

Although in the arrangements of Fig. 1 a single hollow core magnet 15 is illustrated as meeting the needs for appropriate arc control, and in subsequent ones of the illustrations the means for creating the required magnetic field has been diagrammatically shown as a single winding, it should be understood that while ordinarily an air core magnet affords a strong enough magnetic field for satisfactory arc control, if a stronger magnetic field is desirable, one or more solid or hollow iron or ferrite cored magnets may of course be used. Moreover, if found more convenient a group of iron core or air core magnets may be associated with a group of electrodes, as when the size and/or shape of the workpiece requires the use of a comparatively large number of electrodes and/or when the space available for creating an appropriate magnetic field or fields is not appropriate for accommodating a single magnet structure. For added field strength magnets may if desired be arranged on two opposite sides of the electrodes.

Any of the foregoing arrangements is also capable of electric arc flame heating or of arc flame heating and subsequent electric conduction heating of a workpiece to a working temperature. Also, as will be understood, in some of such arrangements relative movement between the workpiece and the electrodes, or periodic reversal of the connection of the power leads to the electrodes may be required to obtain a uniform temperature of the workpiece along the entire length of the path to be heated. This is particularly true when the arrangement is of a simple nature as shown in Fig. 3 wherein without one of such facilities less heating will take place at the far ends of electrodes 19 and 20 opposite gap 123 than at the starting gap 121. Reversal is also obviously necessary in an arrangement such as shown in Fig. 10. Since a workpiece such as 25 (Figs. 1–3) is an article of revolution, the simplest method of obtaining uniform heating may be to rotate it. As herein before pointed out uniform heating may nevertheless be obtained without its rotation by changing the direction of arc travel. The times at which changes in direction of arc travel are effected is not critical. They can be made just after the arc has passed the middle of an electrode, at the end of the travel, or after any given number of complete cycles in one direction. Under such circumstances the reversals of current flow can be most economically effected in the magnet circuit.

If an ordinary constant voltage power source were connected to any of the arrangements herein described, the heating current would vary between widely separated limits because of the large changes in arc voltage which take place when the short starting arc is stretched out and wrapped around the workpiece. This would result in very uneven heating, but is prevented in the circuits shown in Figs. 3, 9 and 10 by use of the magnet as a ballast reactor. Where such a ballast reactor is not used, a suitable power of constant current power supply must be used. The magnet may however be energized from an independent source of suitable phase relative to the arc current or may even comprise a permanent magnet of suitable strength.

As illustrated in the tuned transformer circuit of Fig. 11, regulation of the arc voltage to compensate for increasing arc length can be accomplished, however, by the use of a tuning inductance 125 in series with the primary winding of a power transformer T1 and a tuning capacitor 126 in bridge of the secondary of such transformer.

As illustrated in the resonant T-circuit of Fig. 12, regulation is obtained by a resonant circuit wherein the power supply lead 127 contains tuning capacitors 129 and 130 and a tuning inductance 131 is connected in bridge of leads 127 and 128 at a point between such capacitors.

As illustrated in the monocyclic square circuit of Fig. 13, the network comprises capacitors 132 and 133 and tuning inductances 134 and 135 connected in series bridges across the power supply leads 136 and 137 with the magnetic arc supply leads 141 and 142 bridged across the leads extending between the respective inductances and capacitors.

Any one of the power supply networks illustrated in Figs. 11, 12 or 13 may be used, and of course other power supply circuits will occur to those skilled in the art, but as will be understood in all cases proper phase relations must be maintained between the magnet currents and arc currents to insure deflection of the arc in desired directions.

What is claimed is:

1. In an electric glass working system, arc runner electrodes for arrangement in spaced end to end relation in a common plane about a workpiece to be electrically heated, an electromagnet associated with said arc runner electrodes and whose magnetic lines of force have a component which passes at right angles to the plane thereof, circuit connections providing an energizing circuit for said electromagnet, and power supply leads extending to said arc runner electrodes.

2. An electric glass working system such as defined by claim 1 wherein the winding of said electromagnet is connected in series with one of said power supply leads.

3. An electric glass working system such as defined by claim 1 wherein means is provided for periodically reversing the connections to the leads extending to said runner electrodes.

4. An electric glass working system such as defined by claim 1 wherein the arc runner electrodes are hollow, have entrance passages along the margins thereof opposite the workpiece and are adapted for connection with a vacuum line.

5. An electric glass working system such as defined by claim 1 which includes electrodes having associated gates that may be closed to halt the travel of arcs there-along.

6. An electric glass working system such as defined by claim 1 which includes an arc return conductor surrounding said electrodes.

7. An electric glass working system such as defined by claim 6 wherein the electromagnet comprises a helix adapted to surround a workpiece and has a support arranged thereover upon which the electrodes and the arc return conductor are arranged.

8. In an electric glass working system, arc runner electrodes for arrangement in spaced relation about a workpiece to be electrically heated, an electromagnet associated with said arc runner electrodes and whose magnetic lines of force pass at right angles to the plane thereof, and means for the association of a power source with said arc runner electrodes.

9. An electric glass working system such as defined by claim 8 wherein said power supply means comprises a pair of brushes and associated means for effecting their successive association with the adjacent pairs of said arc runner electrodes.

10. An electric glass working system such as defined by claim 8 wherein, means is provided for selectively connecting such power source to groups of said electrodes in succession.

11. An electric glass working system such as defined by claim 8 wherein each of the respective leads to said arc runner electrodes includes an impedance.

11. An electric glass working system such as defined by claim 8 wherein there are at least four electrodes, and means is provided for simultaneously applying potential to paired ones of such electrodes.

13. An electric glass working system such as defined by claim 12 wherein the potential is applied only to alternate ones of such pairs.

14. In a glass working system, arc runner electrodes arranged in a common plane in spaced relation alongside a workpiece to be electrically heated and a magnet whose magnetic lines of force have a component which pass at right angles to the plane thereof.

15. A glass working system such as defined by claim 14 wherein power supply leads are connected only to alternate ones of the electrodes.

16. A glass working system such as defined by claim 14 wherein the magnet has an energizing winding.

17. A glass working system such as defined by claim 14 wherein one electrode is connected to one lead of a power supply source via the magnet winding, and one electrode is connected to another lead of the power supply source via the output winding of a high frequency pilot current source.

18. A glass working system such as defined by claim 14 provided with a power supply circuit which includes the primary winding of a power transfromer and a tuning inductance in series and a power feed circuit including the secondary winding of such transformer and a condenser connected in parallel.

19. A glass working system such as defined by claim 14 which includes a resonant power supply circuit in which one conductor extends directly from a terminal of a current source to a work input electrode and a second conductor extends from a second terminal of such current source to a work input electrode and includes two condensers, connected in series, and a tuning inductance in bridge parallel of such conductors and connected to the second conductor at a point between such condensers.

20. A glass working system such as defined by claim 14 which includes a monocyclic square power supply network comprising two conductors connected to the respective terminals of a power supply source, a first bridge across said conductors comprising a condenser connected to one conductor and a tuning inductance connected to said other conductor and a second tuning inductance connected to said one conductor, and power supply leads for said arc runner electrodes connected to the junctions of said inductances and their associated condensers.

References Cited in the file of this patent

UNITED STATES PATENTS

| | | |
|---|---|---|
| 1,984,488 | Mulder | Dec. 18, 1934 |
| 2,040,215 | Rava | May 12, 1936 |
| 2,046,117 | Guest | June 30, 1936 |
| 2,186,647 | Lowd et al. | Jan. 9, 1940 |
| 2,306,054 | Guyer | Dec. 22, 1942 |
| 2,428,969 | Guyer | Oct. 14, 1947 |
| 2,439,754 | Schutz | Apr. 13, 1948 |
| 2,472,851 | Landis et al. | June 14, 1949 |
| 2,633,522 | Berg et al. | Mar. 31, 1953 |

FOREIGN PATENTS

| | | |
|---|---|---|
| 751,196 | Great Britain | June 27, 1956 |